United States Patent
Ensan et al.

(10) Patent No.: US 9,657,653 B2
(45) Date of Patent: May 23, 2017

(54) GAS PRESSURE HIGH AND LOW DETECTION

(71) Applicant: Caterpillar Inc, Peoria, IL (US)

(72) Inventors: Behnaz Ensan, Peoria, IL (US); Steven Thomas Grant, Groveland, IL (US); Matthew Benjamin Yandell, Peoria, IL (US); Hardikkumar Shah, Peoria, IL (US); Sunil Jefferey Bean, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/299,185

(22) Filed: Jun. 9, 2014

(65) Prior Publication Data

US 2015/0354473 A1    Dec. 10, 2015

(51) Int. Cl.
| | |
|---|---|
| F02D 19/06 | (2006.01) |
| G01L 13/00 | (2006.01) |
| F02D 41/00 | (2006.01) |
| F02D 41/38 | (2006.01) |
| F02D 19/10 | (2006.01) |
| F02D 41/22 | (2006.01) |

(52) U.S. Cl.
CPC ..... *F02D 19/0628* (2013.01); *F02D 19/0647* (2013.01); *F02D 19/105* (2013.01); *F02D 41/0027* (2013.01); *F02D 41/3836* (2013.01); *G01L 13/00* (2013.01); *F02D 2041/224* (2013.01); *F02D 2200/0602* (2013.01); *Y02T 10/36* (2013.01)

(58) Field of Classification Search
CPC ............ F02D 19/0628; F02D 19/0647; F02D 41/0027; F02M 21/0215; F02B 3/12; F02B 77/085; G01L 13/00
USPC .......................... 123/526, 575; 701/103, 104
See application file for complete search history.

(56) References Cited

U.S. PATENT DOCUMENTS

| | | | |
|---|---|---|---|
| 5,708,202 A | 1/1998 | Augustin et al. | |
| 6,526,948 B1 | 3/2003 | Stavnheim et al. | |
| 6,840,228 B2 * | 1/2005 | Yomogida | F02D 41/3836 123/447 |
| 6,879,903 B2 * | 4/2005 | Jaliwala | F02D 41/2441 123/478 |
| 7,100,574 B2 | 9/2006 | Otani | |
| 7,463,967 B2 * | 12/2008 | Ancimer | F02D 19/10 123/480 |
| 7,627,416 B2 * | 12/2009 | Batenburg | F02D 19/027 123/525 |
| 7,873,460 B2 * | 1/2011 | Nakata | F02D 41/222 123/457 |

(Continued)

FOREIGN PATENT DOCUMENTS

| | | |
|---|---|---|
| EP | 1441120 A2 | 7/2004 |
| EP | 2653706 | 10/2013 |
| WO | 2007049780 A1 | 5/2007 |

*Primary Examiner* — Grant Moubry

(74) *Attorney, Agent, or Firm* — Miller, Matthias & Hull

(57) ABSTRACT

A system and method for detecting pressure deviation of a first fluid in an engine is disclosed. The method may comprise calculating, for each of a plurality of measurements, a delta between an actual first fluid pressure and a target pressure, summing each delta obtained from the calculating, and determining pressure deviation of the first fluid based on a cumulative sum of the deltas. In an embodiment, the first fluid may be natural gas.

20 Claims, 5 Drawing Sheets

(56) References Cited

U.S. PATENT DOCUMENTS

| | | | |
|---|---|---|---|
| 7,891,339 B2* | 2/2011 | Takahashi | F02D 41/2467 |
| | | | 123/447 |
| 7,909,020 B2 | 3/2011 | Orikabe | |
| 8,166,806 B2 | 5/2012 | Kappelmann et al. | |
| 8,191,411 B2 | 6/2012 | Bossemeyer et al. | |
| 8,210,155 B2* | 7/2012 | Ohta | F02D 41/3845 |
| | | | 123/446 |
| 8,285,471 B2 | 10/2012 | Sugiyama et al. | |
| 8,459,234 B2 | 6/2013 | Nakata et al. | |
| 2011/0166803 A1 | 7/2011 | Koidl et al. | |
| 2013/0199499 A1 | 8/2013 | Pursifull | |

* cited by examiner

GAS PRESSURE HIGH AND LOW DETECTION

TECHNICAL FIELD

The present disclosure generally relates to monitoring of the pressure of natural gas utilized in engines and, more particularly, relates to the monitoring of the pressure of natural gas used in dual fuel engines used in earth moving and mining vehicles, on highway trucks, standalone engines for power generation, and the like.

BACKGROUND

Diesel engines are used in a wide variety of industrial applications. These engines are known as compression ignition engines because they are internal combustion engines that utilize the heat of compression to ignite the diesel fuel in the combustion chamber of the engine.

Many industrial applications where diesel engines are used would benefit environmentally and economically from use of natural gas as the engine fuel. Natural gas is generally readily available, tends to be more economical and produces less undesirable emissions when burned. Furthermore, engines burning natural gas generally may have fewer maintenance problems. However, the ignition of natural gas in compression ignition engines may be difficult because natural gas has a much higher temperature for auto ignition than diesel fuel. To resolve this problem a small amount of pilot fuel, such as diesel fuel, may be used to start ignition of the primary fuel, natural gas, in the combustion chamber of the engine.

Detection of high and low natural gas pressures in the gas rail may be beneficial for engine performance. Overly high gas pressures may be a factor in engine injectors misfiring and may lead to premature component wear. Overly low gas pressures may result in low engine power. Similarly, detection of high and low natural gas pressures in the gas system upstream of the gas rail may be beneficial to engine performance since overly high gas pressures may wear or damage filters or seals, and overly low gas pressure may result in low gas pressure in the gas rail and low engine power.

U.S. Pat. No. 7,100,574 discloses technology for detecting an abnormality in a pressure on an inlet side of a supply pump or an inlet side of a high-pressure pump included in the supply pump. If the inlet pressure is outside of a predetermined range for a predetermined period of time, the system determines that the pressure is abnormal. While this system may help reduce the false detection of abnormality due to system noise, the system has drawbacks because the system overlooks pressure deviations that do not last longer than the predetermined range. A design is needed for the detection of high and low gas pressures in the gas rail and in the gas system.

SUMMARY OF THE DISCLOSURE

In accordance with one aspect of the disclosure, a system for a dual fuel engine is disclosed. The system may include a gas system, a diesel rail and a controller. The gas system may include a gas rail configured to provide natural gas to the engine, and an accumulator configured to store the natural gas. The accumulator may be disposed upstream of the gas rail and may be fluidly connected to the gas rail. The diesel rail may be configured to provide diesel fuel to the engine. The controller may be configured to calculate, for each of a plurality of measurements, a delta between an actual natural gas pressure in the gas system and a target pressure, sum each delta obtained from the calculating, and determine pressure deviation in the gas system based on a cumulative sum of the deltas.

In accordance with another aspect of the disclosure, a method of detecting pressure deviation of a first fluid in an engine is disclosed. The method may include calculating, for each of a plurality of measurements, a delta between an actual first fluid pressure and a target pressure, summing each delta obtained from the calculating and determining pressure deviation of the first fluid based on a cumulative sum of the deltas.

In accordance with a further aspect of the disclosure, a method of detecting high pressure deviation of natural gas provided to an engine by a gas system is disclosed. The method may include, if an actual natural gas system pressure of the gas system is greater than an upper threshold, incrementing, by a controller, a counter until a counter limit is reached and determining high pressure deviation of the natural gas based on consecutive natural gas system pressure readings. In an embodiment, the counter may only be incremented by the controller for consecutive natural gas system pressure readings that are each greater than the upper threshold.

DETAILED DESCRIPTION

Figure 1:
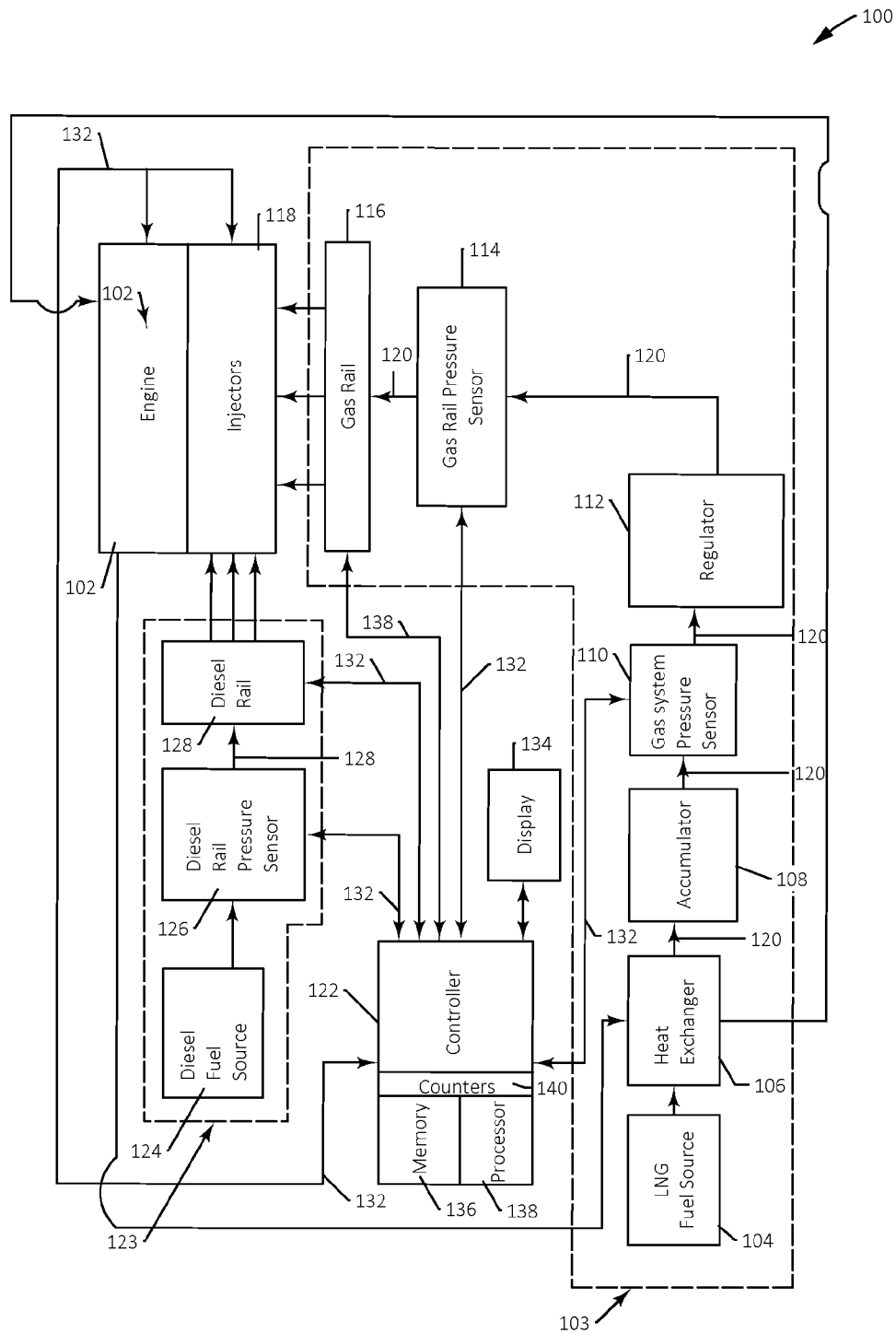
FIG. 1 is a is a general schematic view of an exemplary embodiment of a system in accordance with the teachings of this disclosure.

Referring now to the drawings, and with specific reference to FIG. 1, there is shown one embodiment of a system, generally referred to by reference numeral 100, for monitoring the pressure of natural gas (NG) received by an engine 102 in accordance with the present disclosure. The engine includes a plurality of injectors 118 fluidly connected to a combustion chamber of the engine 102. The system 100 may comprise a gas system 103 fluidly connected to the plurality of injectors 118, a diesel system 123 fluidly connected to the plurality of injectors 118, a controller 122 and communication lines 132. The system 100 may further include a display 134.

The gas system 103 may include a Liquid Natural Gas (LNG) fuel source 104, a heat exchanger 106, an accumulator 108, a gas system pressure sensor 110, a regulator 112, a gas rail pressure sensor 114, a gas rail 116 fluidly connected to the plurality of injectors 118, and a gas line 120. The diesel system 123 may include a diesel fuel source 124, a diesel rail pressure sensor 126, a diesel rail 128 fluidly connected to the plurality of injectors 118, and a diesel line 130.

While the following detailed description and drawings are made with reference to a system 100 for an engine 102 used in a mining or construction vehicle, the teachings of this disclosure may be employed on other types of vehicles or in standalone engines used in various power generation applications.

Turning back to FIG. 1, the heat exchanger 106 is configured to receive liquid natural gas (LNG) from a LNG fuel source 104. The heat exchanger 106 may be further configured to also receive a fluid supply. In some embodiments, the fluid supply may be engine coolant received from the engine 102. The heat exchanger 106 is also configured to emit through an outlet Compressed Natural Gas (CNG) into the gas line 120. In some embodiments, the heat exchanger 106 may also be configured to emit return coolant into a return channel to the engine 102. The heat exchanger 106 may be any appropriate type of heat exchanger/vaporizer as is known in the art for heat transfer between a warmer fluid and a colder fluid.

The accumulator 108 is configured to store CNG prior to receipt by the regulator 112. The accumulator 108 is fluidly connected to the regulator 112. CNG released from the accumulator 108 flows to the regulator 112. The accumulator 108 may be any appropriate type of accumulator 108 as is known in the art for storage of CNG in a gaseous fuel system.

The gas system pressure sensor 110 is configured to measure the pressure of the gas in the gas line 120 (the "natural gas system pressure"). In an embodiment, the gas system pressure sensor 110 may be disposed downstream of and immediately after the accumulator 108, and upstream (and before) the regulator 112, the gas rail pressure sensor 114, and the gas rail 116. The gas system pressure sensor 110 may be any appropriate type of sensor known in the art for measuring gas pressure in a fuel line carrying natural gas and transmitting such data through a communication line 132 to the controller 122 for processing.

Each communication line 132 may be an optical channel, or any other wired, wireless or radio channel or any other type of channel capable of transmitting data between two points.

The regulator 112 may be configured to adjust the pressure of the natural gas in the gas line 120 to a predetermined value. In one embodiment, the regulator may be a Dome Loaded Regulator (DLR), as is known in the art or any other appropriate regulator that may be used to adjust the pressure of the natural gas in the gas line 120.

The gas rail pressure sensor 114 is configured to measure the pressure of the gas in the gas rail 116 or upstream of and adjacent to the gas rail 116 (the "natural gas rail pressure"). In an embodiment, the gas rail pressure sensor 114 may be disposed downstream of the regulator 112 and before the gas rail 116. The gas rail pressure sensor 114 may be any appropriate type of sensor known in the art for measuring gas pressure in a fuel line carrying natural gas to a gas rail 116 and transmitting such data through a communication line 132 to the controller 122 for processing.

Each injector 118 of the plurality is fluidly connected to the combustion chamber (not shown) of the engine 102 and is configured to inject the CNG received from the gas rail 116 into the combustion chamber of the engine 102.

The gas line 120 may be disposed between the heat exchanger 106 and the gas rail 116, and is configured to carry the CNG received from the heat exchanger 106 to the gas rail 116. The gas rail 116 is configured, as is known in the art, to provide CNG to the plurality of injectors 118 for injection into the combustion chamber of the engine 102.

The diesel rail pressure sensor 126 is configured to measure the pressure of diesel fuel in the diesel rail 128 or adjacent (and upstream of) the diesel rail 128 (the "diesel fuel pressure"). In an embodiment, the diesel rail pressure sensor 126 may be disposed downstream of the diesel fuel source 124 and before the diesel rail 128. The diesel rail pressure sensor 126 may be any appropriate type of sensor known in the art for measuring diesel fuel pressure in a fuel line carrying diesel fuel to a diesel rail 128 and transmitting such data through a communication line 132 to the controller 122 for processing.

The diesel rail 128 is configured, as is known in the art, to provide diesel to the plurality of injectors 118 for injection into the combustion chamber of the engine 102 to start ignition in the combustion chamber.

The controller 122 may include a processor 138, a memory component 136 and a plurality of counters 140. The controller 122 may be operably connected to the injectors 118, the gas system pressure sensor 110, the gas rail pressure sensor 114, and the diesel rail pressure sensor 126. In embodiments the controller 122 may also be operably connected to the gas rail 116, the diesel rail 128, and the engine 102. In embodiments that include a display 134, the controller may be operable connected to the display 134.

The processor 138 may be a microprocessor or other processor as known in the art. The processor 138 may execute instructions and generate control signals for processing diesel pressure data, gas system pressure data and gas rail pressure data. The processor may also execute instructions and generate control signals for determining a target pressure, calculating, for each of a plurality of measurements, a delta between an actual natural gas pressure and a target pressure, summing each delta obtained from the calculating, determining the pressure deviation based on a cumulative sum of the deltas, and setting the cumulative sum to zero after the summing limit is reached. Such instructions may be read into or incorporated into a computer readable medium, such as the memory component 136 or provided external to the processor 138. In alternative embodiments, hard wired circuitry may be used in place of, or in combination with, software instructions to implement a control method.

The term "computer readable medium" as used herein refers to any non-transitory medium or combination of media that participates in providing instructions to the processor 138 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other medium from which a computer processor 138 can read.

The controller 122 is not limited to one processor 138 and memory component 136. The controller 122 may be several processors 138 and memory components 136.

In one embodiment, the plurality of counters may include a high rail pressure fail counter 140*a*, a high rail pressure pass counter 140*b*, a low rail pressure fail counter 140*c*, a low rail pressure pass counter 140*d*. In another embodiment, the plurality of counters may also include, or alternatively include, a low gas pressure fail counter 140*e*, and a low gas pressure pass counter 140*f*. In another embodiment, the plurality of counters may also include, or alternatively include, a high event fail counter 140g, a high event pass reset counter 140h, a high event pass counter 140i and a high event fail reset counter 140j.

INDUSTRIAL APPLICABILITY

Figure 2:
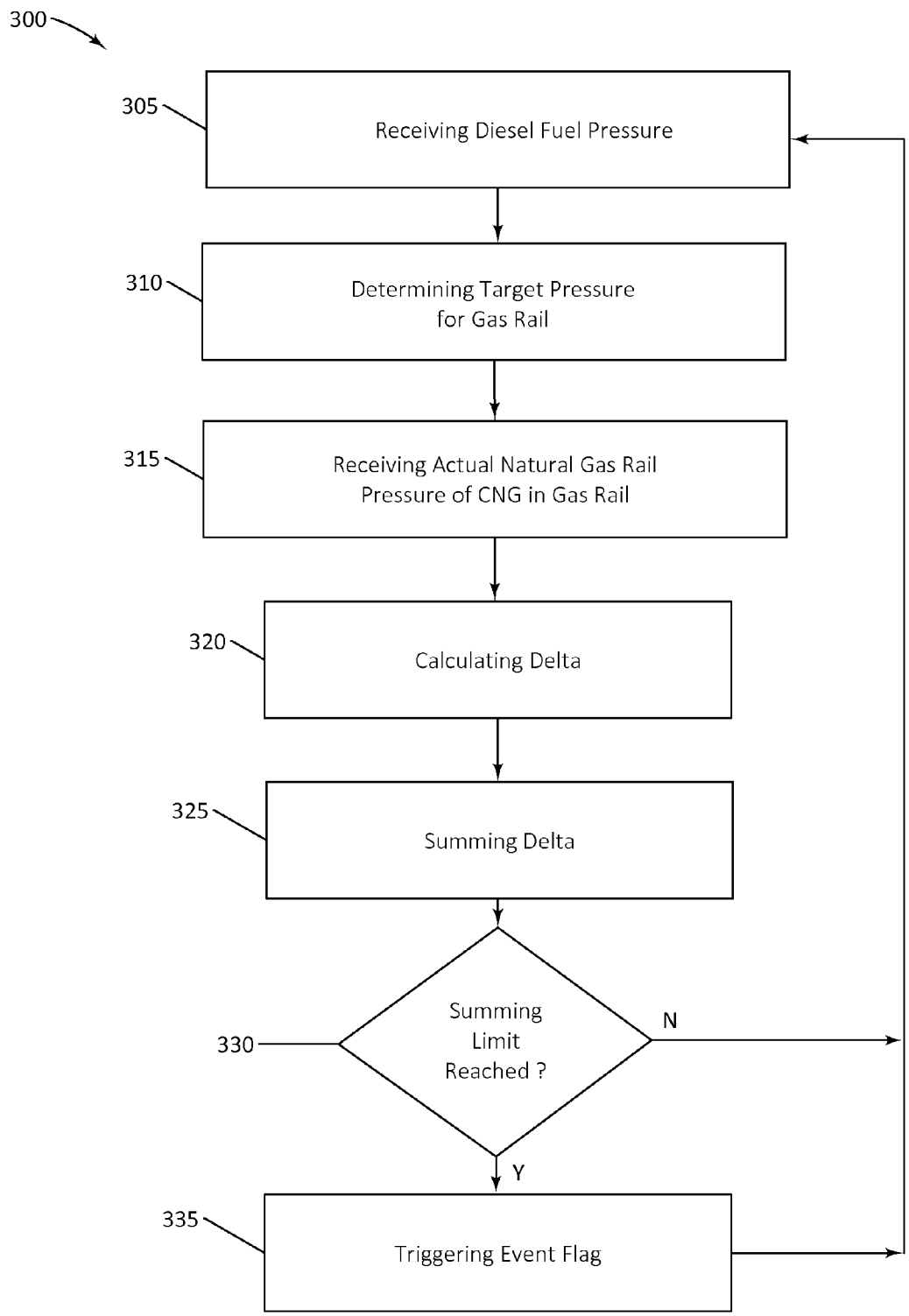
FIG. 2 is flowchart illustrating exemplary steps of a method of detecting pressure deviation of a fluid in accordance with the teachings of this disclosure.

Referring now to FIG. 2, for a gas system 103 in which the regulator 112 is a DLR, an exemplary flowchart is illustrated showing sample steps which may be followed in detecting the pressure deviation of a first fluid, in a rail, such as a gas rail 116, which provides fluid to the combustion chamber of the engine 102 via the engine's injectors 118. The method 300 may be practiced with more or less than the number of steps shown and is not limited to the order shown.

Step 305 of the method includes receiving, by the controller 122, the actual pressure of a second fluid used by the engine 102. The second fluid may be different from the first fluid. In the exemplary embodiment illustrated in FIG. 2, the first fluid may be CNG and the second fluid may be diesel fuel that is provided to the engine 102, by the diesel rail 128, to start ignition of the natural gas. The pressure of the diesel fluid (actual diesel fuel pressure) may be measured by the diesel rail pressure sensor 126 and is representative of the pressure of the diesel fuel in the diesel rail 128.

Step 310 includes determining, by the controller 122, a target pressure for the CNG in the gas rail 116. The target pressure may be based on the actual measured pressure of the diesel fuel provided by the diesel rail pressure sensor 126. The target pressure may be a range that includes an upper threshold, a desired pressure, and a lower threshold. The desired pressure may be the ideal pressure for the natural gas in the gas rail 116, and the upper threshold may be the highest pressure within a target range and the lower threshold may be the lowest pressure within a target range. For example, in one exemplary embodiment where the diesel pressure is 40 MPa, the desired pressure may be 35 MPa, the upper threshold may be 40 MPa and the lower threshold may be 30 MPa. These values are exemplary and, in other embodiments, other values may be utilized. The desired pressure may be the actual diesel pressure less a DLR bias.

Step 315 of the method includes receiving, by the controller 122, the actual pressure of the first fluid, in the exemplary embodiment, the actual natural gas rail pressure of the CNG used by the engine 102. The actual natural gas rail pressure may be measured by the gas rail pressure sensor 114 and is representative of the pressure of the CNG in the gas rail 116.

In step 320, the controller 122 calculates a delta between the actual natural gas rail pressure and the target pressure. The delta may be calculated as the actual natural gas rail pressure minus the target pressure.

In step 325, the method includes summing the delta obtained from the calculating until a summing limit is reached. In one exemplary embodiment, if the actual natural gas rail pressure of the CNG in the gas rail 116 is greater than the upper threshold of the target range, the delta is added to one of the plurality of counters 140, namely, the high rail pressure fail counter 140a. The delta in that scenario is the difference between the actual natural gas rail pressure and the upper threshold. If the actual natural gas rail pressure of the CNG in the gas rail 116 is greater than the desired pressure of the target range but equal to or less than the upper threshold, the delta is added to a second of the plurality of counters, namely the high rail pressure pass counter 140b. The delta, in that scenario may be calculated as the difference between the actual natural gas rail pressure and the desired pressure. In some embodiments, the delta may also be subtracted (or a negative value of the delta may be added) from the value in the high rail pressure fail counter 140a. If the actual natural gas rail pressure of the CNG in the gas rail 116 is less than the lower threshold of the target range, the delta is added to a third of the plurality of counters 140, namely, the low rail pressure fail counter 140c. The delta in that scenario is the difference between the actual natural gas rail pressure and the lower threshold. If the actual natural gas rail pressure of the CNG in the gas rail 116 is less than the desired pressure of the target range but equal to or greater than the lower threshold, the delta is added to a fourth of the plurality of counters, namely the low rail pressure pass counter 140d. The delta, in that scenario may be calculated as the difference between the actual natural gas rail pressure and the desired pressure.

The deltas in each counter 140a-d are summed until a summing limit is reached. In step 330, the controller determines whether a predetermined summing limit has been reached in any one of the counters. Such summing limit may be stored in the memory 136 and retrieved by the controller 122. Each counter 140a-d may have a different predetermined summing limit. If no summing limit has been reached, the process repeats starting at step 305.

If, in step 330, the summation of the deltas in the high rail pressure fail counter 140a reaches a predetermined summing limit for the high pressure fail counter 140a, a high pressure event flag is triggered in step 335 and the high rail pressure fail counter 140a and the high rail pressure pass counter 140b are set to zero and the process repeats starting at step 305. In one exemplary embodiment, the triggering of the high pressure event flag may result in the controller 122 displaying an operator warning message on the display 134 that the pressure regulating function is not working appropriately and/or that the CNG pressure is high. If, the summation of the deltas in the high rail pressure pass counter 140b reaches a predetermined summing limit for the high rail pressure pass counter 140b, a high pressure pass event flag is triggered in step 335 and any active high pressure event/flag is removed and the process repeats starting at step 305.

If, in step 330, the summation of the deltas in the low rail pressure fail counter 140c reaches a predetermined summing limit for the low rail pressure fail counter 140c, a low pressure event flag is triggered in step 335, the low rail pressure fail counter 140c and the low rail pressure pass counter 140d are set to zero, and the process repeats starting at step 305. In one embodiment, the triggering of a low pressure event flag may result in the controller 122 displaying on the display 134 an operator warning message that the pressure regulating function is not working appropriately and/or that the CNG pressure is low. It may also result in a cryogenic pump for the LNG being disabled and the engine 102 switched to operating on diesel fuel only. If, the summation of the deltas in the low rail pressure pass counter 140d reaches a predetermined summing limit for the low rail pressure pass counter 140d, a low pressure pass event flag is triggered in step 335 and any active low pressure event/flag is removed and the process repeats starting at step 305.

Figure 3:
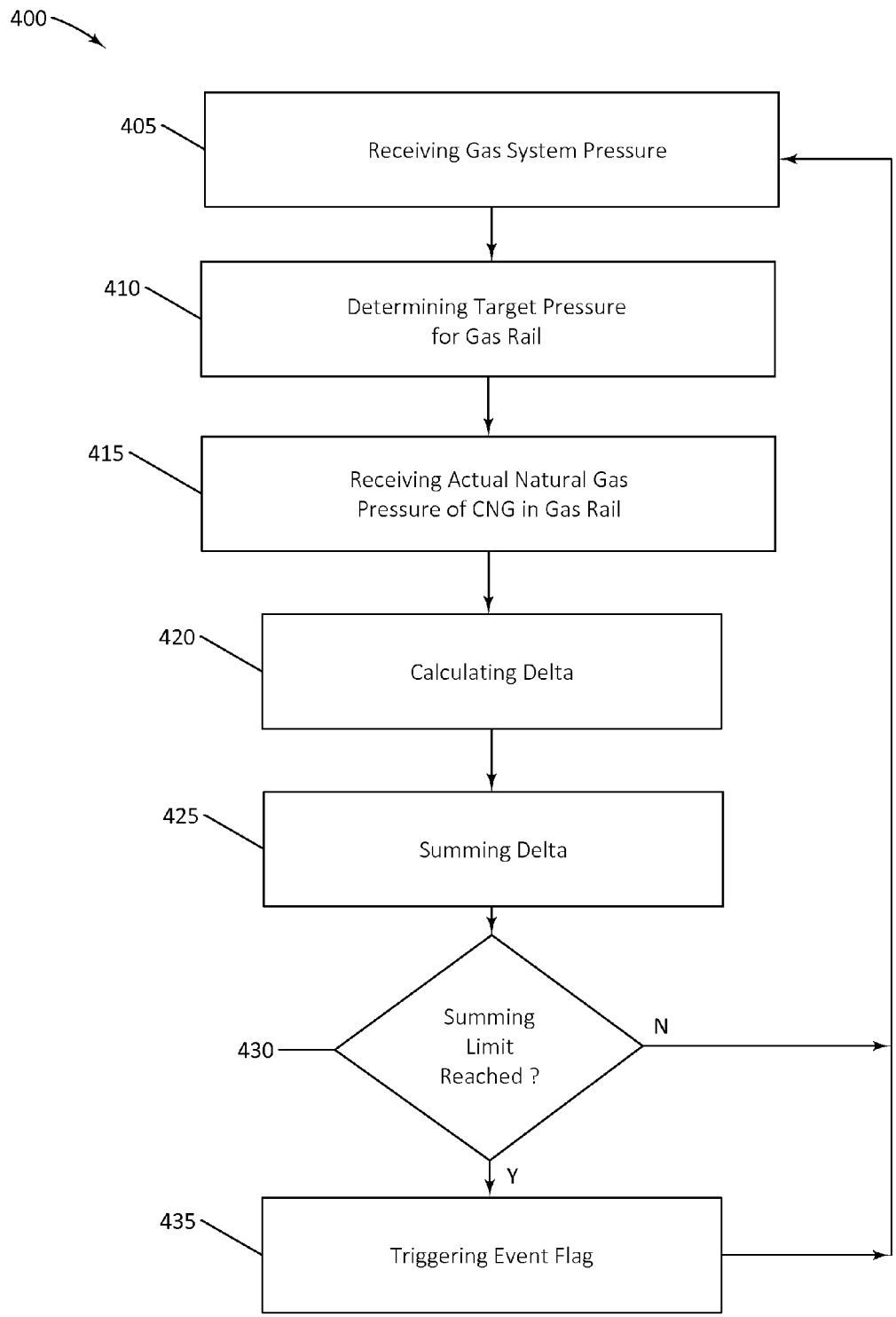
FIG. 3 is flowchart illustrating exemplary steps of a method of detecting pressure deviation of a fluid in accordance with the teachings of this disclosure.

Referring now to FIG. 3, for gas systems 103 in which the gas pressure regulator 112 is not a mechanical gas regulator such as a DLR, an exemplary flowchart is illustrated showing sample steps which may be followed in detecting the pressure deviation of a natural gas in a gas rail 116, which provides fluid to the combustion chamber of the engine 102 via the engine's injectors 118. In such a gas system 103, the gas pressure regulator 112 may be an Inlet Metering Valve (IMV) that is electronically controlled by software. The method 400 may be practiced with more or less than the number of steps shown and is not limited to the order shown.

Step 405 of the method includes receiving, by the controller 122, the actual natural gas system pressure. The actual natural gas system pressure may be measured by the gas system pressure sensor 110 and is representative of the pressure of the CNG in the gas system 103. In an embodiment, the actual natural gas system pressure may be measured downstream of and adjacent to the accumulator 108.

Step 410 includes determining, by the controller 122, a target pressure for the CNG in the gas rail 116. The target pressure may be based on the actual natural gas system pressure provided by the gas system pressure sensor 110. The target pressure may be a range that includes an upper threshold, a desired pressure, and a lower threshold. The desired pressure may be the desired pressure for the natural gas in the gas rail 116, and the upper threshold may be the highest pressure within a target range and the lower threshold may be the lowest pressure within a target range. For example, in one exemplary embodiment where the actual natural gas system pressure is 35 MPa, the desired pressure in the gas rail 116 may be 35 MPa, the upper threshold may be a 40 MPa and the lower threshold may be 30 MPa. These values are exemplary and, in other embodiments, other values may be utilized.

Step 415 of the method includes receiving, by the controller 122, the actual natural gas rail pressure. The actual natural gas rail pressure may be measured by the gas rail pressure sensor 114 and is representative of the pressure of the CNG in the gas rail 116.

In step 420, the controller 122 calculates a delta between the actual natural gas rail pressure and the target pressure. The delta may be calculated as the actual natural gas rail pressure minus the target pressure.

In step 425, the method includes summing the delta obtained from the calculating until a summing limit is reached. In one exemplary embodiment, if the actual natural gas rail pressure of the CNG in the gas rail 116 is greater than the upper threshold of the target range, the delta is added to one of the plurality of counters 140, namely, the high rail pressure fail counter 140a. The delta in that scenario is the difference between the actual natural gas pressure and the upper threshold. If the actual natural gas rail pressure of the CNG in the gas rail 116 is greater than the desired pressure of the target range but equal to or less than the upper threshold, the delta is added to a second of the plurality of counters, namely the high rail pressure pass counter 140b. The delta, in that scenario may be calculated as the difference between the actual natural gas pressure and the desired pressure. In some embodiments, the delta may also be subtracted (or a negative value of the delta may be added) from value in the high rail pressure fail counter 140a. If the actual natural gas rail pressure of the CNG in the gas rail 116 is less than the lower threshold of the target range, the delta is added to a third of the plurality of counters 140, namely, the low rail pressure fail counter 140c. The delta in that scenario is the difference between the actual natural gas rail pressure and the lower threshold. If the actual natural gas rail pressure of the CNG in the gas rail 116 is less than the desired pressure of the target range but equal to or greater than the lower threshold, the delta is added to a fourth of the plurality of counters 140, namely the low rail pressure pass counter 140d. The delta, in that scenario may be calculated as the difference between the actual natural gas rail pressure and the desired pressure.

The deltas in each counter 140a-d are summed until a summing limit is reached. In step 430, the controller determines whether a predetermined summing limit has been reached in any one of the counters. Such summing limit may be stored in the memory 136 and retrieved by the controller 122. Each counter 140a-d may have a different predetermined summing limit. If no summing limit has been reached, the process repeats starting at step 405.

If, in step 430, the summation of the deltas in the high pressure fail counter 140a has been reached, a predetermined summing limit for the high rail pressure fail counter 140a, a high pressure event flag is triggered in step 435 and the high rail pressure fail counter 140a and the high rail pressure pass counter 140b are set to zero and the process repeats starting at block 405. In one exemplary embodiment, the triggering of the high pressure event flag may result in the controller 122 displaying an operator warning on the display 134 that the pressure regulating function is not working appropriately and/or that the CNG pressure is high. If the summation of the deltas in the high rail pressure pass counter 140b reaches a predetermined summing limit for the high rail pressure pass counter 140b, a high pressure pass event flag is triggered in step 435 and any active high pressure event/flag is removed and the process repeats starting at step 405.

If, in step 430, the summation of the deltas in the low rail pressure fail counter 140c reaches a predetermined summing limit for the low rail pressure fail counter 140c, a low pressure event flag is triggered in step 435, the low rail pressure fail counter 140c and the low rail pressure pass counter 140d are set to zero, and the process repeats starting at step 405. In one embodiment, the triggering of a low pressure event flag may result in the controller 122 displaying on the display 134 an operator warning that the pressure regulating function is not working appropriately and/or that the CNG pressure is low. It may also result in a cryogenic pump for the LNG being disabled and the engine 102 switched to operating on diesel fuel only. If the summation of the deltas in the low rail pressure pass counter 140d reaches a predetermined summing limit for the low rail pressure pass counter 140d, a low rail pressure pass event flag is triggered in step 435 and any active low pressure event/flag is removed and the process repeats starting at step 405.

Figure 4:
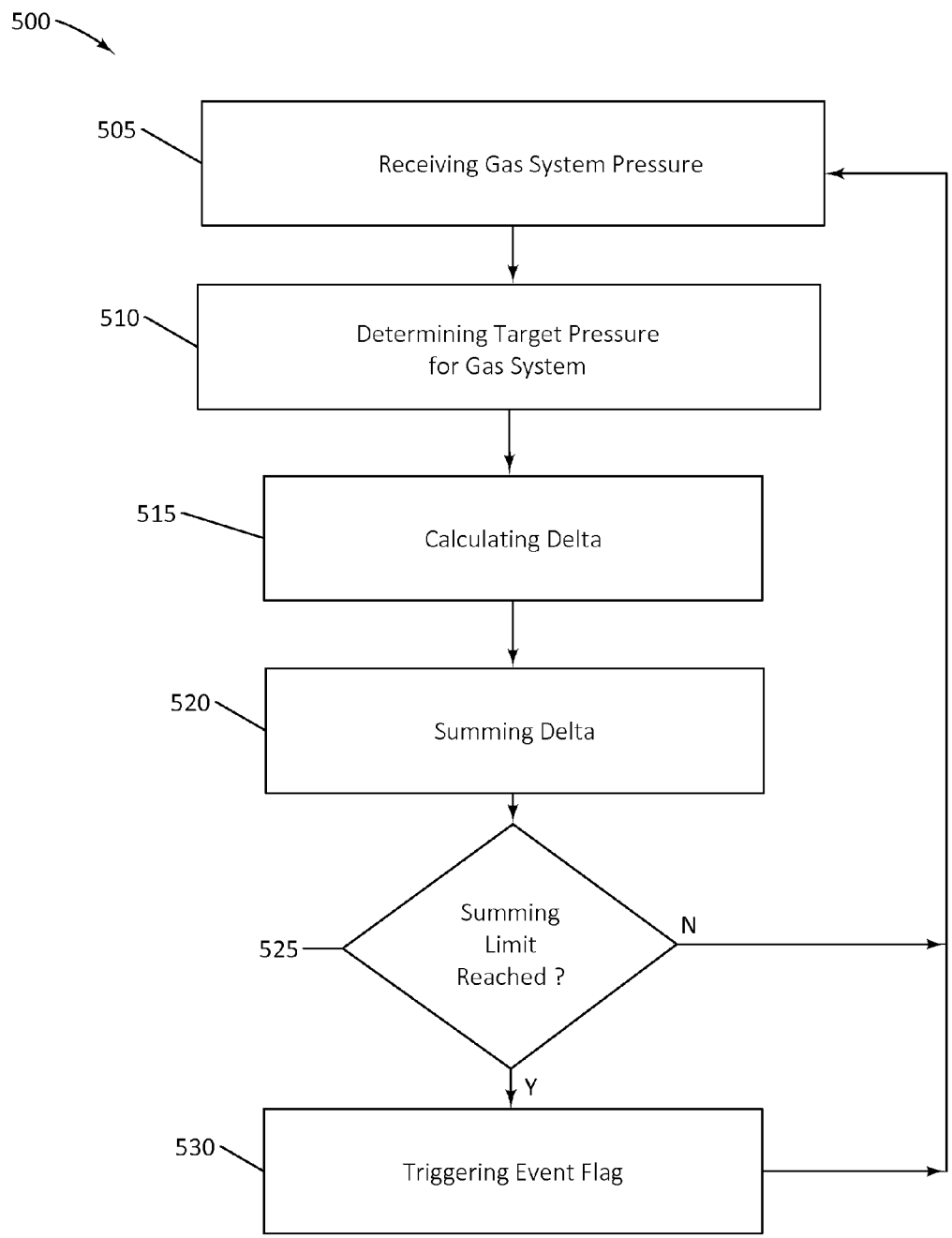
FIG. 4 is flowchart illustrating exemplary steps of a method of detecting pressure deviation, in particular low pressure deviation, of a fluid in accordance with the teachings of this disclosure.

Referring now to FIG. 4, an exemplary flowchart is illustrated showing sample steps which may be followed in detecting pressure deviation, particular low pressure deviation, of a first fluid, such as CNG, in the gas system 103 that provides that fluid to the gas rail 116 that is fluidly connected to the engine 102. The method 500 may be practiced with more or less than the number of steps shown and is not limited to the order shown.

Step 505 of the method includes receiving, by the controller 122, the actual natural gas system pressure. The actual natural gas system pressure may be measured by the gas system pressure sensor 110 and is representative of the pressure of the CNG in the gas system 103. In an embodiment, the actual natural gas system pressure may be measured downstream of and adjacent to the accumulator 108.

Step 510 includes determining, by the controller 122, a target pressure for the CNG in the gas system 103. The target pressure may be based on the natural gas system pressure appropriate for the gas system 103. The target pressure may be a range that includes an upper threshold, a desired pressure, and a lower threshold. The upper threshold may be the maximum pressure value appropriate for the gas system 103. The desired pressure may be the desired pressure for the natural gas in the gas system 103. The lower threshold may be the lowest appropriate pressure for the natural gas in the gas system 103.

In step 515, the controller 122 calculates a delta between the actual natural gas system pressure and the target pressure. The delta may be calculated as the actual natural gas system pressure minus the target pressure.

In step 520, the method includes summing the delta obtained from the calculating until a summing limit is reached. In one exemplary embodiment, if the actual natural gas system pressure is less than the lower threshold of the target range, the delta is added to a fifth of the plurality of counters 140, namely, the low gas pressure fail counter 140e. The delta in that scenario is the difference between the actual natural gas system pressure and the lower threshold.

If the actual natural gas system pressure is less than the desired pressure but equal to or greater than the lower threshold, the delta is added to a sixth of the plurality of counters 140, namely the low gas pressure pass counter 140f. The delta, in that scenario may be calculated as the difference between the actual natural gas system pressure and the desired pressure.

The deltas in each counter 140e-f are summed until a summing limit is reached. In step 525, the controller 122 determines whether a predetermined summing limit has been reached in any one of the counters 140e-f. Such summing limit may be stored in the memory 136 and retrieved by the controller 122. Each counter 140e-f may have a different predetermined summing limit. If no summing limit has been reached, the process repeats starting at step 505.

If, in step 525, the summation of the deltas in the low gas pressure fail counter 140e has reached a predetermined summing limit for the low gas pressure fail counter 140e, a low pressure gas system event flag is triggered in step 530, the low gas pressure fail counter 140e and the low gas pressure pass counter 140f are set to zero, and the process repeats starting at step 505. In one embodiment, the triggering of a low pressure event flag may result in the controller 122 displaying on the display 134 an operator warning message that the pressure regulating function is not working appropriately and/or that the CNG pressure is low. It may also result in a cryogenic pump for the LNG being disabled and the engine 102 switched to operating on diesel fuel only. If, the summation of the deltas in the low gas pressure pass counter 140f reaches a predetermined summing limit for the low gas pressure pass counter 140f, a low gas system pressure pass event flag is triggered in step 530 and any active low gas system pressure event/flag is removed and the process repeats starting at step 505.

Figure 5:
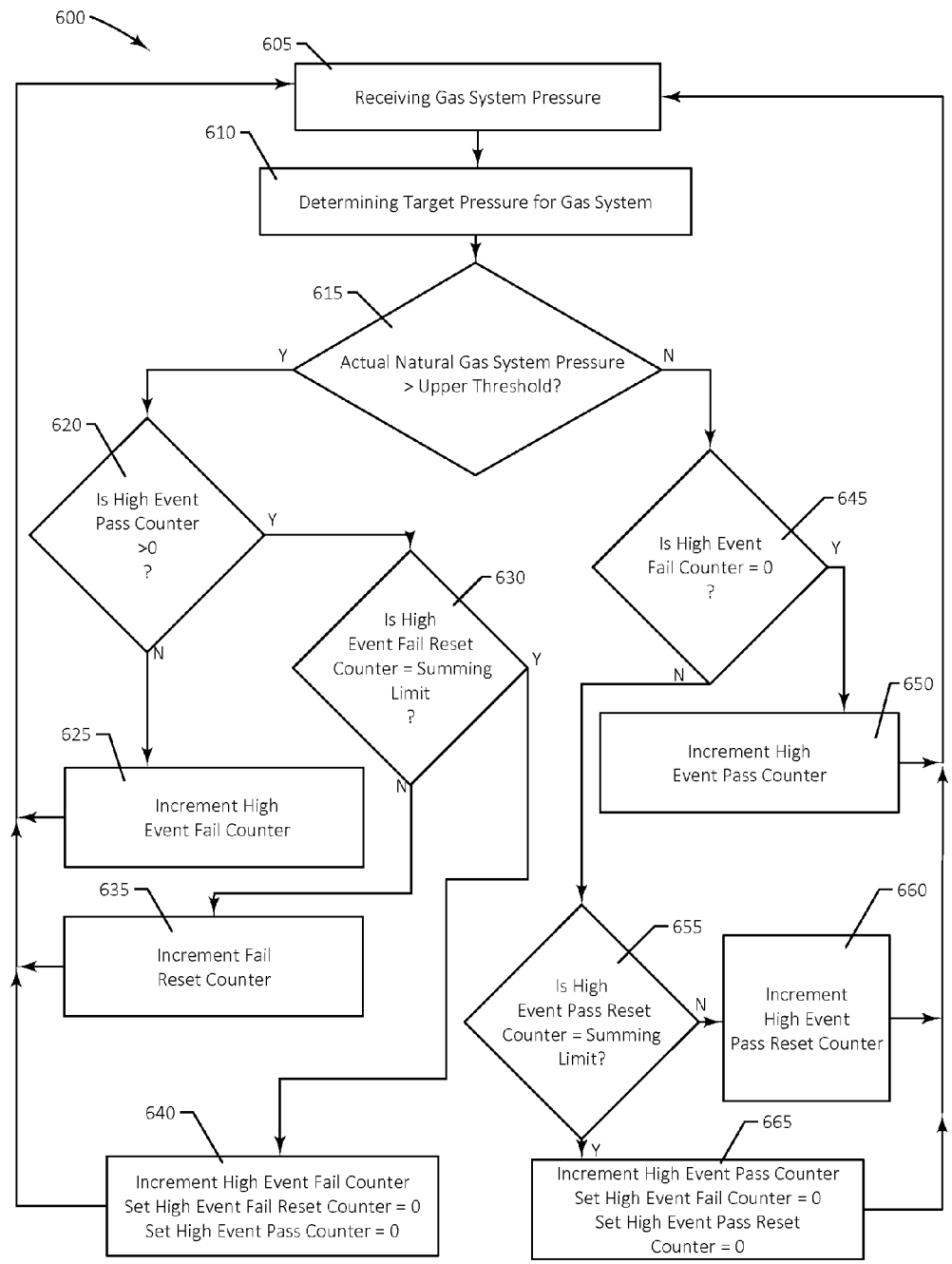
FIG. 5 is flowchart illustrating exemplary steps of a method of detecting pressure deviation of a fluid, in particular high pressure deviation, in accordance with the teachings of this disclosure.

Referring now to FIG. 5, an exemplary flowchart is illustrated showing sample steps which may be followed in detecting pressure deviation, in particular high pressure, of a first fluid, such as CNG, in the gas system 103 that provides that fluid to the gas rail 116 that is fluidly connected to the engine 102. The method 600 may be practiced with more or less than the number of steps shown and is not limited to the order shown. The method of 600 utilizes four of the plurality of counters 140, namely, a high event fail counter 140g, a high event pass reset counter 140h, a high event pass counter 140i and a high event fail reset counter 140j.

Step 605 of the method includes receiving, by the controller 122, the actual natural gas system pressure. The actual natural gas system pressure may be measured by the gas system pressure sensor 110 and is representative of the pressure of the CNG in the gas system 103. In an embodiment, the actual natural gas system pressure may be measured downstream of and adjacent to the accumulator 108.

In step 610 includes determining, by the controller 122, a target pressure for the CNG in the gas system 103. The target pressure may be based on the natural gas system pressure appropriate for the gas system 103. The target pressure may be a range that includes an upper threshold. In an embodiment, the upper threshold may be the maximum pressure value appropriate for the gas system 103.

In step 615, the controller 122 compares the actual natural gas system pressure to the upper threshold. If the actual natural gas system pressure is greater than the upper threshold, the method proceeds to step 620. If no, the method proceeds to step 645.

In step 620, the method determines if the value in the high event pass counter 140i is greater than zero. If no (and the value in the high event pass counter 140i is equal to zero), the method proceeds to step 625 and increments the high event fail counter 140g by a unit of one and then proceeds to step 605. If yes, the method proceeds to step 630.

In step 630, the method determines whether the value in the high event fail reset counter 140j is equal to a predetermined high event fail reset counter summing limit. If no, the method proceeds to step 635 and increments the high event fail counter 140g by a value of one. If yes, the method proceeds to step 640.

In step 640, the high event pass counter 140i is set to a value of zero, the high event fail reset counter 140j is set to a value of zero, and the high event fail counter 140g is incremented by a value of one. The method then proceeds to step 605.

In step 645, the method determines whether the value in the high event fail counter 140g is equal to zero. If yes, the method proceeds to step 650 and increments the value in the high event pass counter 140i by a unit of one. If no, the method proceeds to step 655.

In step 655, the method determines whether the value in the high event pass reset counter 140h is equal to a predetermined high event pass reset counter summing limit. If no, the method proceeds to step 660 and increments the high event pass reset counter 140h by a unit of one. If no, the method proceeds to step 665.

In step 665, the method sets the value in the high event fail counter 140g to zero, sets the value in the high event pass reset counter 140h to zero, and increments the value in the high event pass counter 140i by a unit of one.

Also disclosed is a method of detecting pressure deviation of a first fluid in an engine 102. The method may comprise calculating, for each of a plurality of measurements, a delta between an actual first fluid pressure and a target pressure, summing each delta obtained from the calculating, and determining pressure deviation of the first fluid based on a cumulative sum of the deltas.

Also disclosed is a method of detecting high pressure deviation of natural gas provided to an engine 102 by a gas system 103. The method may comprise, if an actual natural gas system pressure of the gas system 103 is greater than an upper threshold, incrementing, by a controller 122, a counter 140 until a counter limit is reached, and determining high pressure deviation of the natural gas based on consecutive natural gas system pressure readings. In an embodiment, the counter 140 may only be incremented by the controller 122 for consecutive natural gas system pressure readings that are each greater than the upper threshold.

The features disclosed herein may be particularly beneficial for use with mining, earth moving, or construction vehicles.

What is claimed is:

1. A method of detecting pressure deviation of a first fluid in an engine, the method comprising steps of:
calculating, for each of a plurality of measurements, a delta between an actual first fluid pressure and a target pressure;
summing each delta obtained from the calculating step until a summing limit is reached;
determining pressure deviation of the first fluid based on a cumulative sum of the deltas;
triggering a high pressure event flag when the summing limit is reached in a high pressure fail counter; and
providing an operator warning message on a display when the high pressure event flag is triggered.

2. The method of claim 1, wherein the target pressure is based on a pressure of a second fluid used by the engine, the second fluid different than the first fluid.

3. The method of claim 2, wherein the first fluid is natural gas and the second fluid is diesel fuel.

4. The method of claim 3, wherein the actual first fluid pressure is representative of an actual natural gas rail pressure in a gas rail fluidly connected to the engine, and the target pressure is based on a diesel fuel pressure in a diesel rail fluidly connected to the engine.

5. The method of claim 1, wherein the actual first fluid pressure is representative of an actual natural gas rail pressure in a gas rail fluidly connected to the engine, and the target pressure is based on a natural gas system pressure measured upstream of the gas rail.

6. The method of claim 5, wherein the natural gas system pressure is measured adjacent to an accumulator disposed upstream of the gas rail.

7. The method of claim 1, wherein the target pressure is a range.

8. The method of claim 1, wherein the target pressure is a range including an upper threshold, a desired pressure, and a lower threshold.

9. A method of detecting pressure deviation of a first fluid in an engine, the method comprising steps of:
calculating, for each of a plurality of measurements, a delta between an actual first fluid pressure and a target pressure;
summing each delta obtained from the calculating step until a summing limit is reached;
determining pressure deviation of the first fluid based on a cumulative sum of the deltas;
triggering a low pressure event flag when the summing limit is reached in a low pressure fail counter; and
providing an operator warning message a display when the low pressure event flag is triggered.

10. The method of claim 9, wherein the engine is only supplied with diesel fuel when the low pressure event flag is triggered.

11. A method of operating a dual fuel engine, the method comprising steps of:
sensing a gaseous fuel pressure by a plurality of measurements;
calculating, for each of the plurality of gaseous fuel pressure measurements, a delta between an actual gaseous fuel pressure and a target gaseous fuel pressure;
summing each delta obtained from the calculating step until a summing limit is reached;
determining a pressure deviation of the gaseous fuel based on a cumulative sum of the deltas; and
initiating an operational engine response if the pressure deviation of the gaseous fuel exceeds a threshold.

12. The method of claim 11, wherein the target gaseous fuel pressure is based on a pressure of a liquid fuel used by the engine.

13. The method of claim 12, wherein the gaseous fuel is natural gas and the liquid fuel is diesel.

14. The method of claim 12, wherein the actual gaseous fuel pressure is representative of a pressure in a gaseous fuel rail fluidly connected to the engine, and the target gaseous fuel pressure is based on a liquid fuel pressure in a liquid fuel rail fluidly connected to the engine.

15. The method of claim 11, wherein the actual gaseous fuel pressure is representative of a pressure in a gaseous fuel rail fluidly connected to the engine, and the target gaseous fuel pressure is based on a natural gas system pressure upstream of the gaseous fuel rail.

16. The method of claim 15, wherein the natural gas system pressure is measured adjacent to an accumulator disposed upstream of the gaseous fuel rail.

17. The method of claim 11, wherein the target gaseous fuel pressure is a range including an upper threshold, a desired pressure, and a lower threshold.

18. The method of claim 11, wherein the step of initiating an operational engine response if the pressure deviation of the gaseous fuel exceeds a threshold includes triggering a high pressure event flag in an engine controller when the summing limit is reached in a high pressure fail counter and displaying an operator warning.

19. The method of claim 11, wherein the step of initiating an operational engine response if the pressure deviation of the gaseous fuel exceeds a threshold includes triggering a low pressure event flag in an engine controller when the summing limit is reached in a low pressure fail counter and displaying an operator warning.

20. The method of claim 19, wherein the engine is supplied with only diesel fuel when the low pressure event flag is triggered.

* * * * *